United States Patent
Taguchi et al.

(10) Patent No.: US 6,666,028 B2
(45) Date of Patent: Dec. 23, 2003

(54) OPERATION METHOD FOR COMBINED PLANT

(75) Inventors: Jyun Taguchi, Takasago (JP);
Yoshinori Hyakutake, Kobe (JP);
Masayuki Takahama, Kobe (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 10/187,016

(22) Filed: Jul. 2, 2002

(65) Prior Publication Data

US 2003/0005702 A1 Jan. 9, 2003

(30) Foreign Application Priority Data

Jul. 5, 2001 (JP) ........................................ 2001-204873

(51) Int. Cl.⁷ ................................................. F02C 7/12
(52) U.S. Cl. ....................... 60/772; 60/39.182; 60/806
(58) Field of Search .............................. 60/772, 39.182, 60/806

(56) References Cited

U.S. PATENT DOCUMENTS

| 6,128,895 A | | 10/2000 | Takahama et al. | |
|---|---|---|---|---|
| 6,389,797 B1 | * | 5/2002 | Sugishita et al. | ........ 60/39.182 |
| 6,405,537 B1 | * | 6/2002 | Wada et al. | .................. 60/778 |
| 6,546,713 B1 | * | 4/2003 | Hidaka et al. | ........... 60/39.182 |

FOREIGN PATENT DOCUMENTS

| EP | 0 615 061 | 9/1994 |
|---|---|---|
| EP | 0 764 767 | 3/1997 |
| EP | 0 933 505 | 8/1999 |
| EP | 0 939 204 | 9/1999 |
| JP | 3132834 | 11/2000 |

* cited by examiner

*Primary Examiner*—Ehud Gartenberg
(74) *Attorney, Agent, or Firm*—Oblon, Spivak, McClelland, Maier & Neustadt, P.C.

(57) ABSTRACT

An operation method for a combined plant can simplify the steam lines and also decrease the cost for manufacturing combined plants as well. The combined plant comprises a gas turbine plant and a steam turbine plant; the steam turbine plant comprising a steam drum for generating steam and supplying the steam into a steam turbine, a condenser for condensing steam passing through the steam turbine, a steam turbine bypass line for connecting the upstream of the steam turbine and the condenser and bypassing the steam turbine; and a gas turbine steam cooling portion for cooling a hot portion of the gas turbine plant by steam supplied from the steam drum, and which is provided parallel to a pipe connecting the upstream of the steam turbine bypass line and the steam drum, wherein when the combined plant is in a normal operation mode, an amount of steam passing through the gas turbine steam cooling portion is adjusted by a valve which is provided in the steam turbine bypass line.

1 Claim, 6 Drawing Sheets

OPERATION METHOD FOR COMBINED PLANT

BACKGROUND OF THE INVENTION

1. Field of the Invention

The present invention relates to an operation method for a combined plant. Specifically, the present invention relates to an operation method for a combined plant in which a gas turbine plant and a steam turbine plant are combined.

2. Description of the Related Art

In general, a combined plant for power generation has a structure in which a gas turbine plant and a steam turbine plant are combined. In a combined plant, a gas turbine plant operates in a high temperature area and a steam turbine plant operates in a low temperature area, and discharged heat energy from the high temperature area is thereby recovered in the low temperature area. Due to this structure, a combined plant can effectively use heat energy.

Recently, an improvement in heat efficiency of combined plants has been proposed. Heat efficiency of a combined plant can be improved by increasing the temperature at an inlet of a gas turbine which is provided with the gas turbine plant. However, when the temperature at an inlet of a gas turbine is increased, efficiency for cooling a high temperature portion of the gas turbine should also be increased.

In the past, the high temperature portion was cooled by blowing air thereinto; however, air cooling has poor cooling efficiency. Therefore, recently, cooling using steam which has a heat capacity larger than that of air has received much attention.

FIG. 6 shows a main part of a steam cooling system for a high temperature portion of a gas turbine. The steam cooling system shown in FIG. 6 comprises a steam drum 1, superheater 2, a pressure regulating valve 3 for steam supplied into a gas turbine steam cooling portion (abbreviated as "steam pressure regulating valve 3 for GTSCP" below), a motor valve 4, a temperature regulating valve 5 for steam supplied into a gas turbine steam cooling portion (abbreviated as "steam temperature regulating valve 5 for GTSCP" below), a gas turbine steam cooling portion 6 for steam cooling a portion to be cooled of the gas turbine (abbreviated as "gas turbine steam cooling portion 6" below), a check valve 7, a governor 8, a steam turbine 9, and a condenser 10.

In addition, a bypass line 12 is provided, which connects an outlet pipe 11 from the gas turbine steam cooling portion 6 and the condenser 10. To the bypass line 12, a bypass valve 13 is provided.

Furthermore, a steam turbine bypass line 15 is provided in the steam cooling system, which is a bypass pipe connecting an inlet pipe 14 provided at an upstream side of the governor 8, and the condenser 10. Moreover, to the steam turbine bypass line 15, a steam turbine valve 16 is provided.

Below, referring to FIG. 6, a conventional operation method for the combined plant will be briefly explained.

When the combined plant starts, steam generated in an auxiliary boiler and the like passes through an auxiliary steam system and the steam temperature regulating valve 5 for GTSCP, and is sent to the gas turbine steam cooling portion 6. The gas turbine also starts.

At this step, the steam turbine 9 does not start, that is, it shuts down. Therefore, the governor 8 is still closed.

The steam, which is sent in the gas turbine steam cooling portion 6, passes through the bypass line 12 and/or the steam turbine bypass line 15, and it is then recovered in the condenser 10.

As the gas turbine reaches a normal operation mode, a steam pressure from the steam drum 1 reaches a certain value. When the gas turbine is in a normal operation mode and the steam pressure of the steam drum 1 is a certain value, a steam line is changed from the auxiliary steam system into a main steam system.

At this point in time, the governor is still closed. Therefore, steam supplied from the steam drum 1 passes through the steam pressure regulating valve 3 for GTSCP, and the steam turbine bypass line 15, and is then recovered in the condenser 10. Otherwise, it passes through the motor valve 4, the steam temperature regulating valve 5 for GTSCP, the gas turbine steam cooling portion 6, the bypass line 12 and/or the steam turbine bypass line 15, and it is then recovered in the condenser 10.

When the warming-up operation of the steam turbine 9 is finished and the steam turbine 9 permits an introducing of steam, the combined plant is made be in a normal operation mode by gradually opening the governor 8 and gradually increasing the rotation speed of the steam turbine as well, and closing gradually the bypass valve 13 and the turbine bypass valve 16. At a point in time, steam passing through the gas turbine steam cooling portion 6 is recovered in the steam turbine 9.

In a normal operation mode, an amount of steam passing through the gas turbine steam cooling portion 6 is adjusted by opening and closing the bypass valve 13. In other words, when the amount of steam passing though the gas turbine steam cooling portion 6 is small, the amount of steam is increased by opening the bypass valve 13. In contrast, when the amount is too large, it is decreased by closing the bypass valve 13. Moreover, in a normal operation mode, the turbine bypass valve 16 never opens. In order to introduce the steam into the condenser 10, the turbine bypass valve 16 opens only in cases in which the combined plant is in a starting-up mode, a shut-down mode, a steam turbine emergency stop mode in which the steam turbine is stopped in an emergency by an abnormal vibration, decrease in oil pressure, and the like, and an uncontrolled operation mode in which the governor 8 is broken and the amount of steam cannot be controlled, other than a normal operation mode.

In a normal operation mode, in order to adjust the amount of steam flowing through the gas turbine steam cooling portion 6 comprising the combined plant, it is necessary to provide special bypass line 12 and the bypass valve 13 in the combined plant. Thereby, a problem arises in that a steam line is complicated and the cost for manufacturing combined plants is increades as well.

SUMMARY OF THE INVENTION

In consideration of the above described problem with conventional technology, an object of the present invention is to provide an operation method for a combined plant which can simplify the steam lines and decrease the cost for manufacturing the combined plants as well.

In order to achieve the object, the present invention provides an operation method for a combined plant comprising a gas turbine plant and a steam turbine plant; the steam turbine plant comprising a steam drum for generating steam and supplying the steam into a steam turbine, a condenser for condensing steam passing through the steam turbine, a steam turbine bypass line for connecting the upstream of the steam turbine and the condenser and bypassing the steam turbine; and a gas turbine steam cooling portion for cooling a hot portion of the gas turbine plant by steam supplied from the steam drum, and which is provided parallel to a pipe connecting the upstream of the steam turbine bypass line and the steam drum, wherein when the combined plant is in a normal operation mode, an amount of steam passing through the gas turbine steam cooling portion is adjusted by a valve which is provided in the steam turbine bypass line.

According to the operation method for a combined plant, during a normal operation mode of the combined plant, an amount of steam passing through the gas turbine steam cooling portion is adjusted by the valve which is provided in the steam turbine bypass line. That is, an amount of steam passing through the gas turbine steam cooling portion is adjusted by the valve which is provided in the steam turbine bypass line in every case in which the combined plant is in a starting-up mode, a normal operation mode, a shut-down mode, a steam turbine emergency stop mode, and an uncontrolled operation mode.

DETAILED DESCRIPTION OF THE PREFERRED EMBODIMENTS

Figure 1:
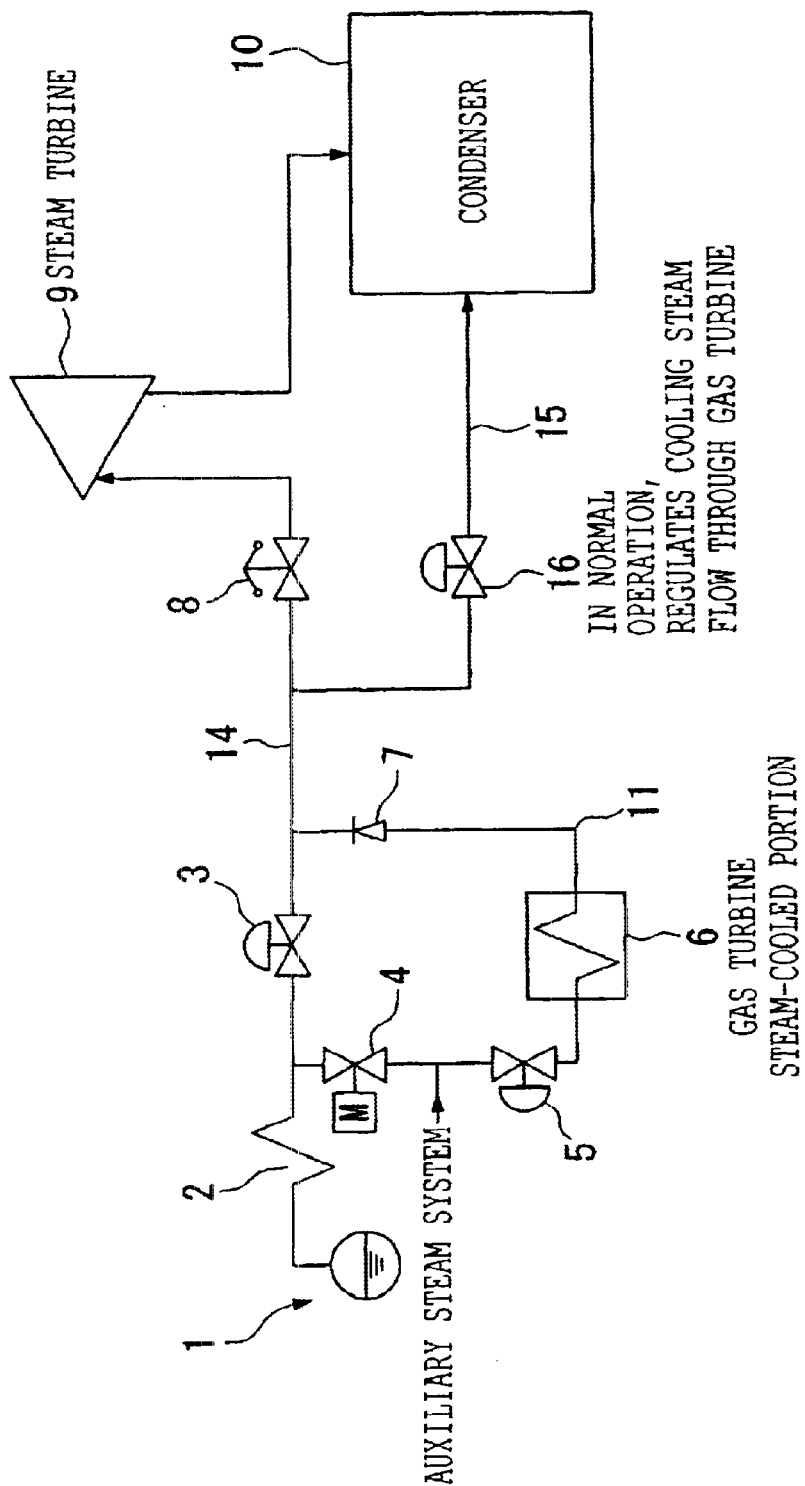
FIG. 1 is a schematic drawing illustrating a first embodiment of the operation method for a combined plant according to the present invention.

Next, the operation method for a combined plant of the present invention will be explained referring to the drawings.

First Embodiment

Figure 6:
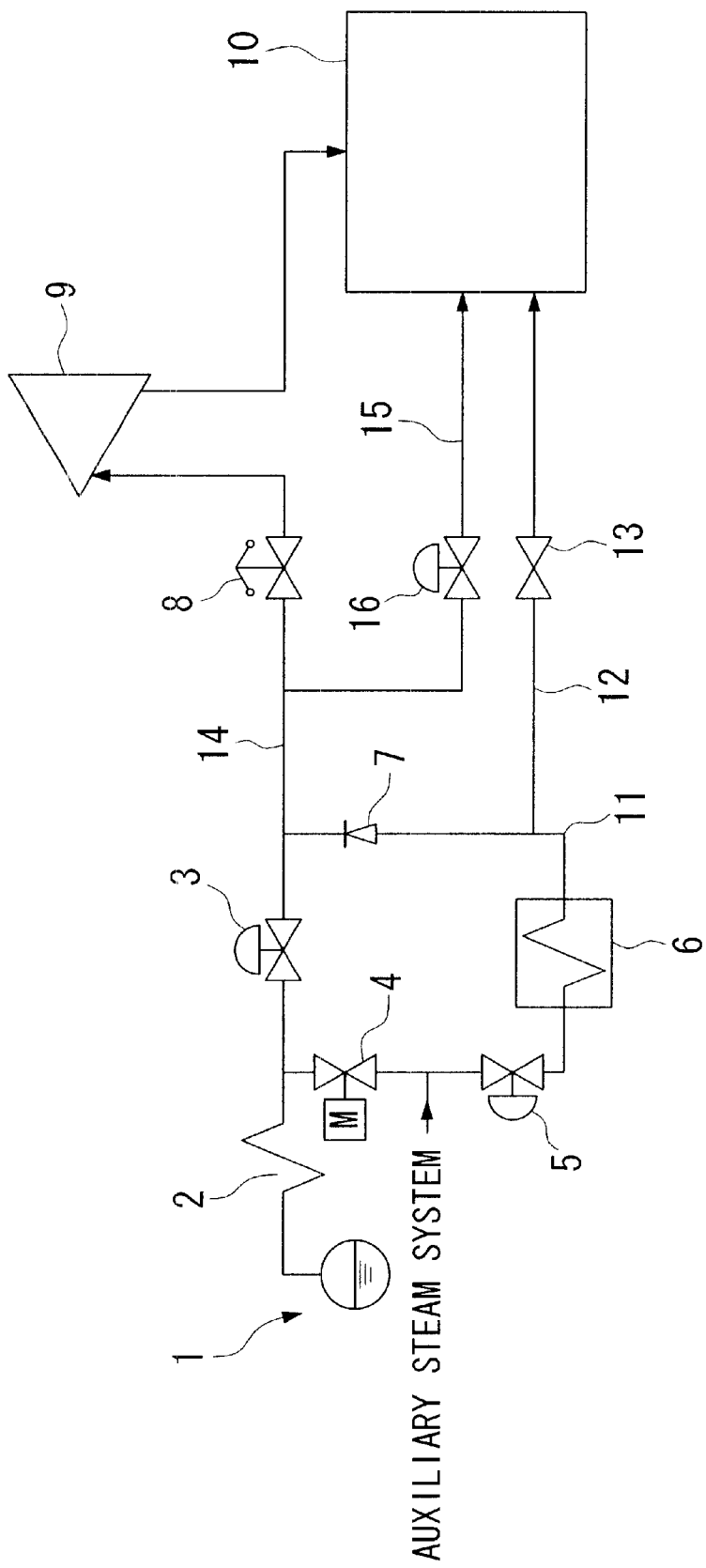
FIG. 6 is a schematic drawing illustrating a conventional operation method for a combined plant.

FIG. 1 is a schematic drawing illustrating a first embodiment of the operation method for a combined plant according to the present invention. Moreover, the components shown in FIG. 1 which are the same as the components shown in FIG. 6 have the same reference numerals as shown in FIG. 6.

The steam cooling system shown in FIG. 1 comprises the steam drum 1, the superheater 2, the steam pressure regulating valve 3 for GTSCP, the motor valve 4, the steam temperature regulating valve 5 for GTSCP, the gas turbine steam cooling portion 6, the check valve 7, the governor 8, the steam turbine 9, and the condenser 10.

In addition, the steam cooling system shown in FIG. 1 comprises the steam turbine bypass line 15 and the steam turbine bypass valve 16. The steam turbine bypass line 15 connects the inlet pipe 14 which is provided at the upstream of the governor 8 and the condenser 10.

Below, the operation method for the combined plant of this embodiment will be explained referring to FIG. 1.

When the combined plant is in a starting-up mode, steam generated in an auxiliary boiler and the like, passes through an auxiliary system and the steam temperature regulating valve 5 for GTSCP, and is sent to the gas turbine steam cooling portion 6. The gas turbine also starts.

At this step, the steam turbine 9 does not start, that is, it shuts down. Therefore, the governor 8 is still closed.

The steam, which is sent in the gas turbine steam cooling portion 6, passes through the steam turbine bypass line 15, and it is then recovered in the condenser 10.

As the gas turbine reaches a normal operation mode, a steam pressure of the steam drum 1 reaches a certain value. When the gas turbine is in a normal operation mode and the steam pressure of the steam drum 1 is at a certain value, a steam line is changed from the auxiliary steam system to a main steam system.

At this point in time, the governor is still closed. Therefore, steam supplied from the steam drum 1 passes through the steam pressure regulating valve 3 for GTSCP and the steam turbine bypass line 15, and is then recovered in the condenser 10. Otherwise, it passes through the motor valve 4, the steam temperature regulating valve 5 for GTSCP, the gas turbine steam cooling portion 6, the check valve 7, and the steam turbine bypass line 15, and it is then recovered in the condenser 10.

When the warming-up operation of the steam turbine 9 is finished and the steam turbine 9 permits an introduction of steam, the combined plant is made be in a normal operation mode by gradually opening the governor 8 and gradually increasing the rotation speed of the steam turbine 9 to a certain value as well, and closing gradually the steam turbine bypass valve 16. Thereby, steam passing through the gas turbine steam cooling portion 6 is recovered in the steam turbine 9.

In a normal operation mode, the amount of steam passing through the gas turbine steam cooling portion 6 is adjusted by opening and closing the steam turbine bypass valve 16. In other words, when the amount of steam passing though the gas turbine steam cooling portion 6 is small, the amount of steam increases by opening the steam turbine bypass valve 16. In contrast, when the amount is too large, it is decreased by closing the steam turbine bypass valve 16.

As is clear from the above, in order to introduce excess steam into the condenser 10, the steam turbine bypass valve 16 opens in every case in which the combined plant is in a starting-up mode, a shut-down mode, a steam turbine emergency stop mode due to an abnormal vibration, decrease in oil pressure, and the like, and an uncontrolled operation mode due to breaking of the governor 8. In addition, even in a normal operation mode, in order to adjust the amount of steam passing through the gas turbine steam cooling portion 6, the steam turbine bypass valve 16 is opened and closed.

According to the operation method for this embodiment, since an amount of steam passing through the gas turbine steam cooling portion 6 can be adjusted by the steam turbine bypass valve 16 even in a normal operation mode, it is possible to omit a special bypass line and bypass valve for the gas turbine steam cooling portion 6, which are necessary in conventional combined plants. Therefore, it is also possible to simplify the steam line system and remarkably decrease the cost for manufacturing the combined plant.

Second Embodiment

Figure 2:
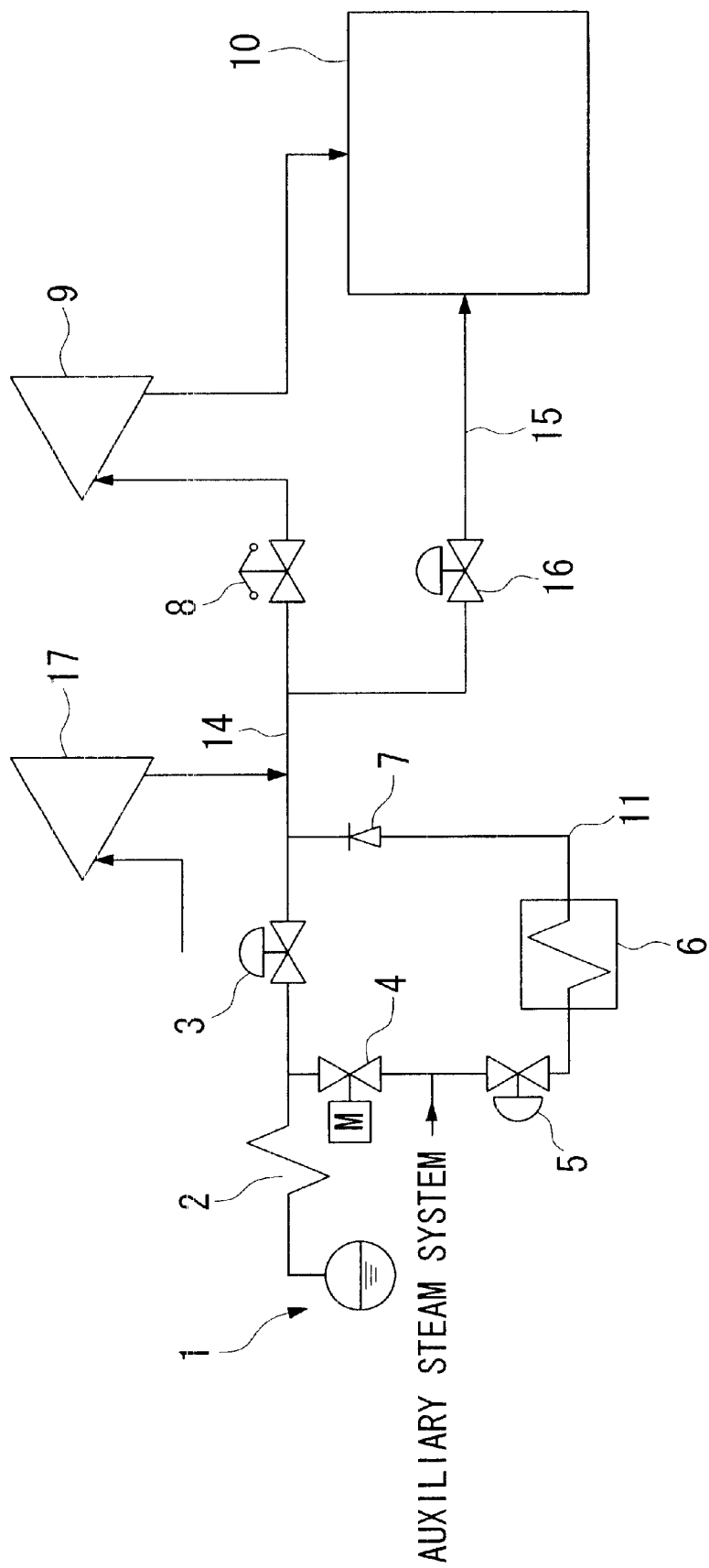
FIG. 2 is a schematic drawing illustrating a second embodiment of the operation method for a combined plant according to the present invention

FIG. 2 is a schematic drawing illustrating a second embodiment of the operation method for a combined plant according to the present invention. Moreover, the components shown in FIG. 2 which are the same as the components shown in FIG. 1 have the same reference numerals as shown in FIG. 1.

In the steam cooling system shown in FIG. 2, exhaust air from a high pressure area 17 of the steam turbine flows to a position which is at the upstream of the steam turbine bypass valve 16 and downstream of the gas turbine steam cooling portion 6 in a pipe connecting the steam pressure regulating valve 3 for GTSCP and the governor 8.

Third Embodiment

Figure 3:
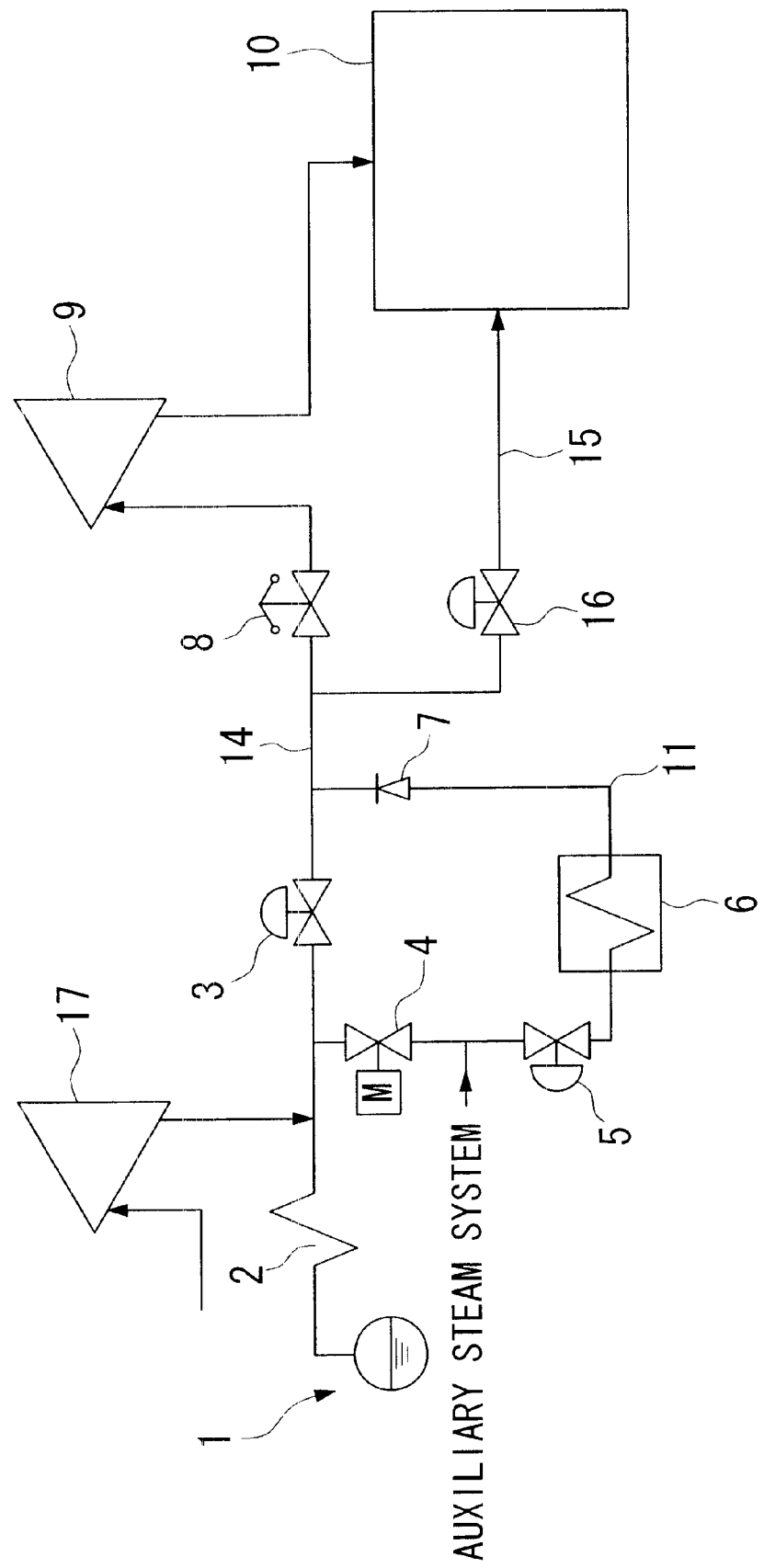
FIG. 3 is a schematic drawing illustrating a third embodiment of the operation method for a combined plant according to the present invention.

FIG. 3 is a schematic drawing illustrating a third embodiment of the operation method for a combined plant according to the present invention. Moreover, the components shown in FIG. 3 which are the same as the components shown in FIG. 1 have the same reference numerals as shown in FIG. 3.

In the steam cooling system shown in FIG. 3, exhaust air from a high pressure area 17 of the steam turbine flows to a position which is at the downstream of the superheater 2 and the upstream of the steam pressure regulating valve 3 for GTSCP and the motor valve 4 in a pipe connecting the superheater 2 and the steam pressure regulating valve 3 for GTSCP.

Fourth Embodiment

Figure 4:
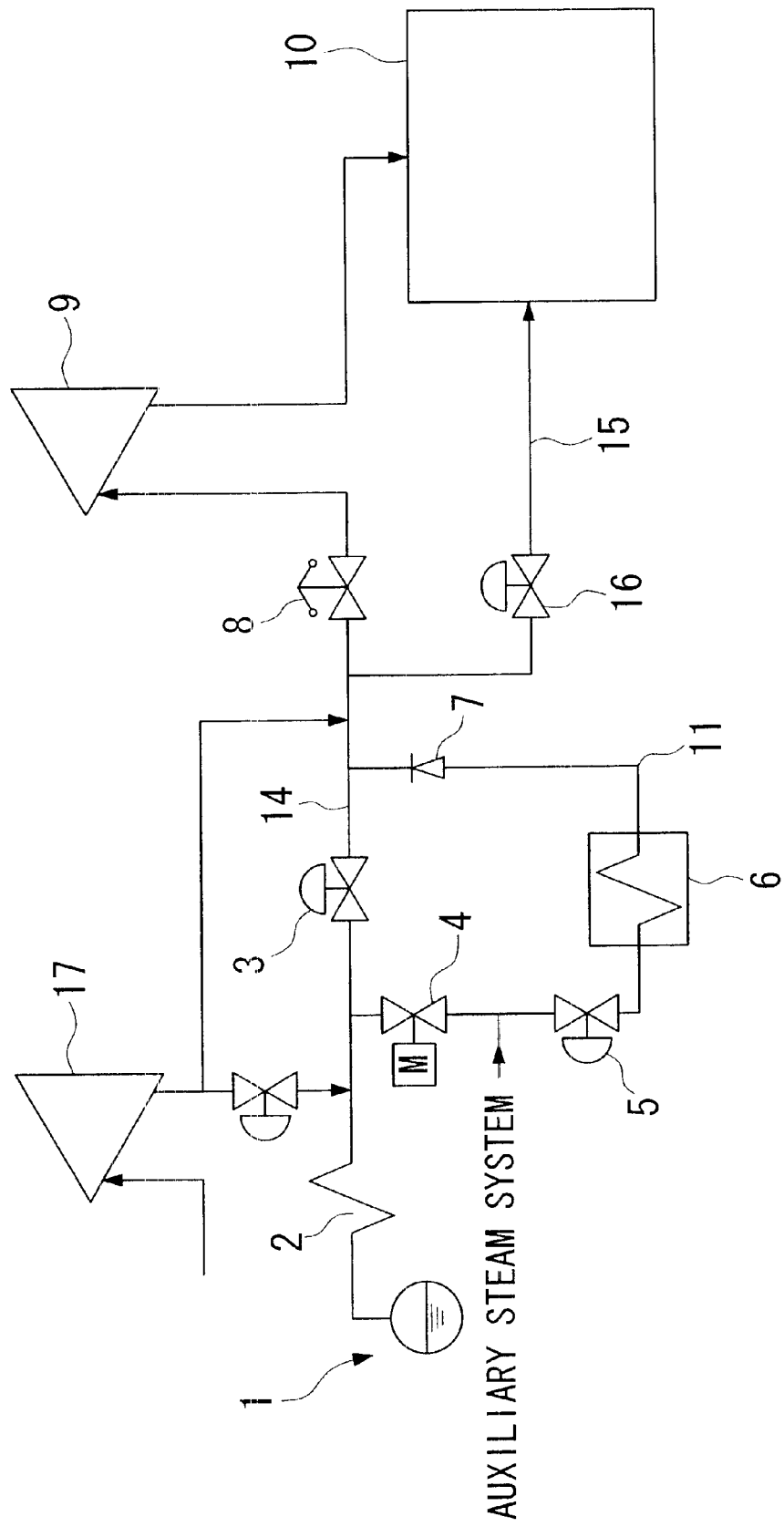
FIG. 4 is a schematic drawing illustrating a fourth embodiment of the operation method for a combined plant according to the present invention.

FIG. 4 is a schematic drawing illustrating a fourth embodiment of the operation method for a combined plant according to the present invention. Moreover, the components shown in FIG. 4 which are the same as the components shown in FIG. 1 have the same reference numerals as shown in FIG. 4.

In the steam cooling system shown in FIG. 4, exhaust air from a high pressure area 17 of the steam turbine flows into a pipe, in a manner similar to that in the second and third embodiments. In other words, in this embodiment, exhaust air from a high pressure area 17 of the steam turbine flows to two positions, one of which is at the upstream of the steam turbine bypass valve 16 and the downstream of the gas turbine steam cooling portion 6 in a pipe connecting the steam pressure regulating valve 3 for GTSCP and the governor 8, and the other of which is at the downstream of the superheater 2 and the upstream of the steam pressure regulating valve 3 for GTSCP and the governor 8 in a pipe connecting the superheater 2 and the steam pressure regulating valve 3 for GTSCP.

Fifth Embodiment

Figure 5:
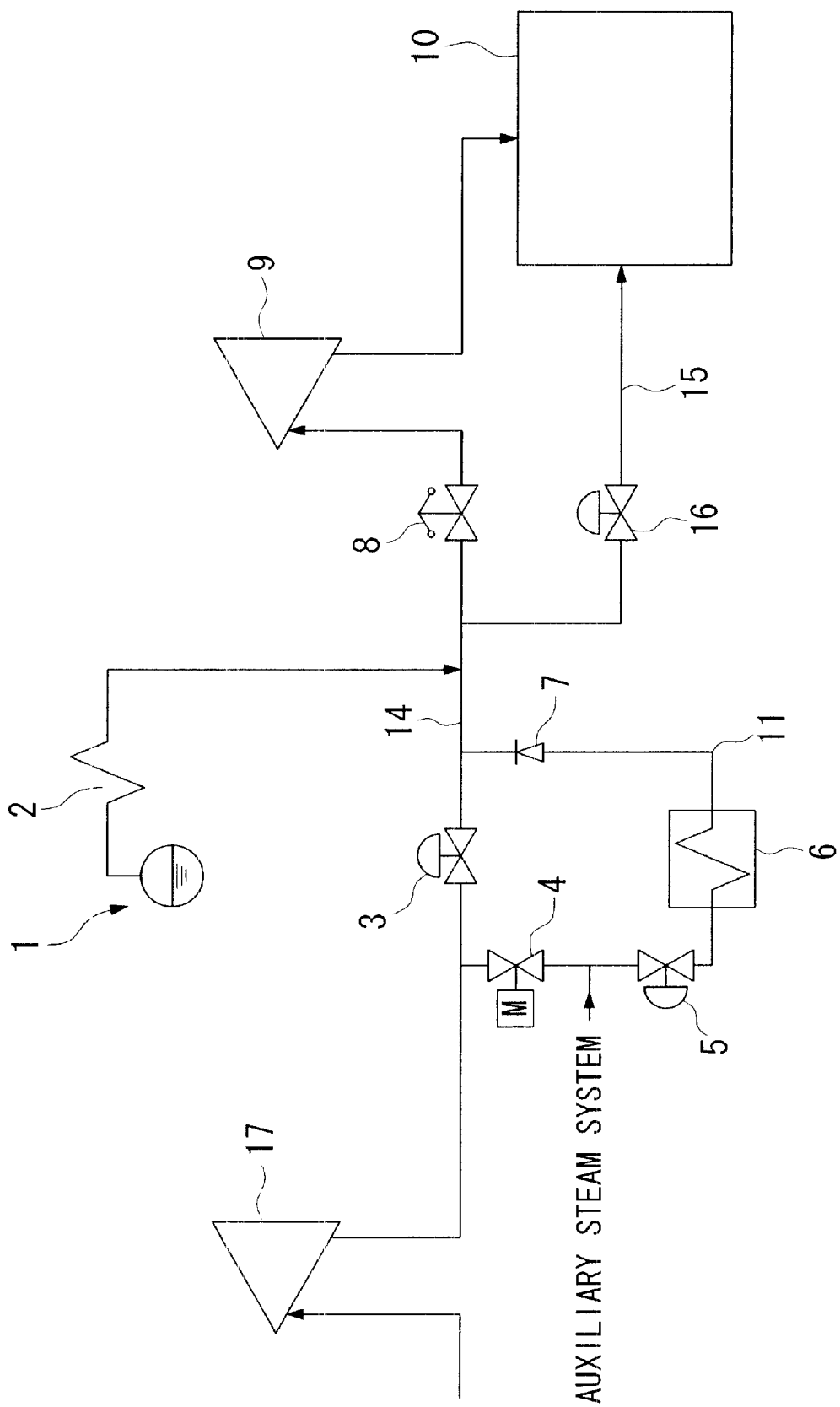
FIG. 5 is a schematic drawing illustrating a fifth embodiment of the operation method for a combined plant according to the present invention.

FIG. 5 is a schematic drawing illustrating a fifth embodiment of the operation method for a combined plant according to the present invention. Moreover, the components shown in FIG. 5 which are the same as the components shown in FIG. 1 have the same reference numerals as shown in FIG. 5.

In the steam cooling system shown in FIG. 5, the position of the steam drum 1 and the superheater 2 is exchanged with the position of the high pressure area 17 of the steam turbine in FIG. 2. In other words, in the steam cooling system shown in FIG. 5, steam passing through the steam drum 1 and the superheater 2 flows into a position which is at the upstream of the steam turbine bypass valve 16 and downstream of the gas turbine steam cooling portion 6 in a pipe connecting the steam pressure regulating valve 3 for GTSCP and the governor 8, and exhaust air from the high pressure area 17 of the steam turbine flows into the steam pressure regulating valve 3 for GTSCP and the motor valve 4.

What is claimed is:

1. An operation method for a combined plant comprising a gas turbine plant and a steam turbine plant, said steam turbine plant comprising:

a steam drum for generating steam and supplying the steam into a steam turbine, a condenser for condensing steam passing through said steam turbine, a steam turbine bypass line for connecting the upstream of said steam turbine and said condenser and bypassing said steam turbine; and a gas turbine steam cooling portion for cooling a hot portion of said gas turbine plant by steam supplied from said steam drum, and which is provided parallel to a pipe connecting the upstream of said steam turbine bypass line and said steam drum, wherein when said combined plant is in a normal operation mode, an amount of steam passing through said gas turbine steam cooling portion is adjusted by a valve which is provided in said steam turbine bypass line.

* * * * *